(12) United States Patent
Nakamura

(10) Patent No.: US 11,834,899 B2
(45) Date of Patent: Dec. 5, 2023

(54) MULTI-STAGE PRISM WINDOW

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 669 days.

(21) Appl. No.: 17/098,335

(22) Filed: Nov. 14, 2020

(65) Prior Publication Data

US 2021/0062575 A1 Mar. 4, 2021

Related U.S. Application Data

(63) Continuation of application No. PCT/JP2019/015714, filed on Apr. 10, 2019.

(30) Foreign Application Priority Data

May 16, 2018 (JP) ................................ 2018-094213

(51) Int. Cl.
  *E06B 9/24* (2006.01)
  *G02B 5/04* (2006.01)
  *F21V 5/02* (2006.01)

(52) U.S. Cl.
  CPC ............ *E06B 9/24* (2013.01); *G02B 5/04* (2013.01); *F21V 5/02* (2013.01)

(58) Field of Classification Search
  CPC ............ E06B 9/24; E06B 2009/2417; E06B 2009/2411; E06B 3/67; E06B 3/6715;
  (Continued)

(56) References Cited

U.S. PATENT DOCUMENTS 982,772 A * 1/1911 Wadsworth .............. F21S 11/00
  359/593
3,393,034 A * 7/1968 Senzo ...................... F21S 11/00
  359/593

(Continued)

FOREIGN PATENT DOCUMENTS

CN 102027183 A * 4/2011 ........... E06B 3/6715
CN 107807418 A * 3/2018 ............ B32B 15/08

(Continued)

OTHER PUBLICATIONS

Jan Oliver Lofken; "Kondensiertes Licht"; World of Physics; "https://www.weltderphysik.de/gebiet/teilchen/news/2015/kondensiertes-licht/"; Oct. 19, 2015.

(Continued)

*Primary Examiner* — Ryan D Kwiecinski
(74) *Attorney, Agent, or Firm* — KENEALY VAIDYA LLP

(57) ABSTRACT

A multi-stage prism window includes: a first prism configured to condense light whose angle is equal to or larger than a first predetermined angle on a reflective member and retroreflect the light; a second prism configured to condense light whose angle is equal to or larger than a second predetermined angle on an endothermic member or a reflective member and use the light for indoor heating; and a liquid control mechanism configured to fill at least one of a first space and a second space with a liquid, the first space being in contact with the first prism from an indoor side, the second space being in contact with the second prism from the indoor side.

9 Claims, 11 Drawing Sheets

(58) Field of Classification Search
CPC ......... E06B 3/6722; G02B 5/04; G02B 5/045; G02B 5/06; F21V 5/02
See application file for complete search history.

(56) References Cited

U.S. PATENT DOCUMENTS

| | | | | | |
|---|---|---|---|---|---|
| 3,603,670 | A | * | 9/1971 | Kim | E04C 2/54 359/593 |
| 4,357,074 | A | * | 11/1982 | Nardini | A01G 9/1438 359/595 |
| 5,461,496 | A | * | 10/1995 | Kanada | E06B 9/24 359/597 |
| 6,311,437 | B1 | * | 11/2001 | Lorenz | F21S 11/00 52/173.3 |
| 6,552,860 | B1 | * | 4/2003 | Alden | F24S 50/80 359/666 |
| 6,992,718 | B1 | * | 1/2006 | Takahara | G02F 1/133553 348/333.09 |
| 8,477,414 | B2 | * | 7/2013 | Suzuki | B32B 17/10 359/360 |
| 8,854,736 | B2 | * | 10/2014 | Yoshida | G02B 5/26 359/359 |
| 8,970,949 | B2 | * | 3/2015 | Suzuki | G02B 5/208 359/359 |
| 8,980,401 | B2 | * | 3/2015 | Nakayama | C08G 73/1035 428/435 |
| 9,004,726 | B2 | * | 4/2015 | Vasylyev | G02B 5/0236 362/330 |
| 9,365,449 | B2 | * | 6/2016 | Ueda | G02B 5/0278 |
| 10,409,150 | B2 | * | 9/2019 | Mitsui | B32B 27/16 |
| 10,538,959 | B2 | * | 1/2020 | Gardiner | E06B 9/322 |
| 10,641,448 | B2 | * | 5/2020 | Kashiwagi | E06B 9/42 |
| 11,300,263 | B2 | * | 4/2022 | Nakamura | F21S 11/007 |
| 11,313,172 | B2 | * | 4/2022 | Nakamura | E06B 3/90 |
| 11,319,749 | B2 | * | 5/2022 | Nakamura | G02B 5/124 |
| 11,572,735 | B2 | * | 2/2023 | Nakamura | E06B 3/67 |
| 11,577,194 | B2 | * | 2/2023 | Nakamura | E06B 9/24 |
| 11,608,676 | B2 | * | 3/2023 | Nakamura | E04B 1/78 |
| 2008/0030859 | A1 | * | 2/2008 | Usami | E06B 3/6715 264/1.9 |
| 2009/0067057 | A1 | * | 3/2009 | Sprague | G02B 27/0101 359/630 |
| 2009/0255568 | A1 | * | 10/2009 | Morgan | H01L 31/0547 136/246 |
| 2011/0199685 | A1 | * | 8/2011 | Ito | B32B 33/00 156/242 |
| 2011/0256350 | A1 | * | 10/2011 | Ito | G02B 5/208 428/156 |
| 2012/0222722 | A1 | * | 9/2012 | Baruchi | H01L 31/0547 136/246 |
| 2014/0233104 | A1 | * | 8/2014 | Nagahama | G02B 5/26 359/585 |
| 2015/0138627 | A1 | * | 5/2015 | Ehrensperger | G03B 21/60 359/443 |
| 2015/0285454 | A1 | * | 10/2015 | Aizenberg | G02B 26/004 29/428 |
| 2016/0372619 | A1 | * | 12/2016 | Dhar | F24S 23/70 |
| 2017/0052295 | A1 | * | 2/2017 | Sakuma | B32B 27/06 |
| 2019/0153776 | A1 | * | 5/2019 | Arima | E06B 9/24 |
| 2020/0324245 | A1 | * | 10/2020 | Nakamura | E06B 7/12 |
| 2020/0328717 | A1 | * | 10/2020 | Nakamura | G02B 5/04 |
| 2021/0047883 | A1 | * | 2/2021 | Nakamura | G02B 5/00 |
| 2021/0062575 | A1 | * | 3/2021 | Nakamura | E06B 9/24 |
| 2022/0057565 | A1 | * | 2/2022 | Cho | G02B 6/0051 |

FOREIGN PATENT DOCUMENTS

| | | | | |
|---|---|---|---|---|
| EP | 1072752 A1 | * | 1/2001 | ......... E06B 9/24 |
| JP | S61-117388 A | | 6/1986 | |
| JP | 2009224253 A | * | 10/2009 | |
| JP | 2015-174810 A | | 10/2015 | |
| JP | 2015-210319 A | | 11/2015 | |
| JP | 2017-151249 A | | 8/2017 | |
| JP | 2017-161692 A | | 9/2017 | |
| JP | 2017-211442 A | | 11/2017 | |
| JP | 2017-214822 A | | 12/2017 | |
| WO | WO-2009121180 A1 | * | 10/2009 | ......... E06B 3/6715 |
| WO | WO-2019131090 A1 | * | 7/2019 | ......... B01D 53/26 |
| WO | WO-2019187880 A1 | * | 10/2019 | ......... E06B 3/663 |
| WO | WO-2019220822 A1 | * | 11/2019 | ......... E06B 3/66 |
| WO | WO-2019220823 A1 | * | 11/2019 | |

OTHER PUBLICATIONS

Wikipedia; "Kondensor"; "https://de.wikipedia.org/wiki/Kondensor"; Dec. 12, 2017.

* cited by examiner

MULTI-STAGE PRISM WINDOW

CROSS REFERENCE TO RELATED APPLICATIONS

This application is a continuation of PCT application No. PCT/JP2019/015714, which was filed on Apr. 10, 2019 based on Japanese patent application 2018-094213 filed on May 16, 2018, whose contents are incorporated herein by reference. Also, all the references cited herein are incorporated as a whole.

BACKGROUND OF THE INVENTION

Technical Field

The present invention relates to a retroreflective window.

Background Art

In related art, there has been proposed a retroreflective window in which a prism is provided between a plurality of transparent plate members or provided integrally with the transparent plate members so as to retroreflect direct light from the sun to the side of the sun (see Patent Literatures 1 to 3). Further, there has also been proposed an indoor use window that uses a prism to reflect direct light and illuminate an indoor ceiling side (see Patent Literatures 4 to 6).

CITATION LIST

Patent Literature

[Patent Literature 1] JP-A-2015-210319
[Patent Literature 2] JP-A-2015-174810
[Patent Literature 3] JP-A-2017-211442
[Patent Literature 4] JP-A-2017-214822
[Patent Literature 5] JP-A-2017-161692
[Patent Literature 6] JP-A-2017-151249

SUMMARY

Here, the present inventors have considered retroreflecting direct light in summer to prevent reduction in cooling efficiency without using the direct light indoors, and using the direct light indoors in winter to improve heating efficiency, for example, and have studied to achieve compatibility between a window that does not directly use direct light indoors like the retroreflective window and a window that directly uses the direct light or uses the direct light for radiant heating like the indoor use window. The present inventors have also studied to make it switchable between the former window and the latter window by using a difference in solar altitude between summer and winter, thereby achieving compatibility between the former window and the latter window. However, in a case where the difference in solar altitude is used, the following problems arise.

FIG. 12 is a graph showing a correlation between southing height, minimum temperature and maximum temperature during one year. As shown in FIG. 12, the southing heights are the same (about 55 degrees) on spring equinox and autumn equinox. Meanwhile, the minimum temperature and the maximum temperature differ by about 15 degrees between the spring equinox and the autumn equinox, and the spring equinox is colder than the autumn equinox despite the same solar altitude. Therefore, in late autumn, the direct light is not desired to be used indoors until the solar altitude falls to 45 degrees while the direct light is desired to be used indoors in spring until the solar altitude reaches 65 degrees, so that a difference in demand is generated therebetween.

Therefore, in a case where a window is created based on the solar altitude of any single season, a state where the direct light is not directly used indoors or a state where the direct light is used indoors is not appropriate in other seasons.

The present invention has been made to solve such a problem, and an object thereof is to provide a multi-stage prism window that can optimize the state where the direct light is not directly used indoors or the state where the direct light is used indoors without depending on the seasons.

Solution to Problem

The multi-stage prism window according to the present invention includes: a first prism configured to condense light whose angle is equal to or larger than a first predetermined angle on an opaque member so as to block an optical path thereof to interior of a room; a second prism configured to condense light whose angle is equal to or larger than a second predetermined angle on an endothermic member or a reflective member and use the light for indoor heating; and a liquid control mechanism configured to fill at least one of a first space and a second space with a liquid, the first space being in contact with the first prism from an indoor side, the second space being in contact with the second prism from the indoor side.

BRIEF DESCRIPTION OF THE DRAWINGS

FIG. 3A shows the optical path when the first space is not filled with water while the second space is filled with water,
and FIG. 3B shows the optical path when the first space is filled with water while the second space is not filled with water.
FIG. 10A shows a first state,
and FIG. 10B shows a second state.
FIG. 11A shows a first state,
and FIG. 11B shows a second state.

DETAILED DESCRIPTION OF EMBODIMENTS

Hereinafter, the present invention will be described in accordance with preferred embodiments. The present invention is not limited to the following embodiments, and can be modified as appropriate without departing from the scope of the present invention.

Although a part of configurations may not be illustrated or described in the embodiments to be described below, it goes without saying that a known or well-known technique is appropriately applied to details of an omitted technique within a range in which no contradiction occurs to contents to be described below.

Figure 1:
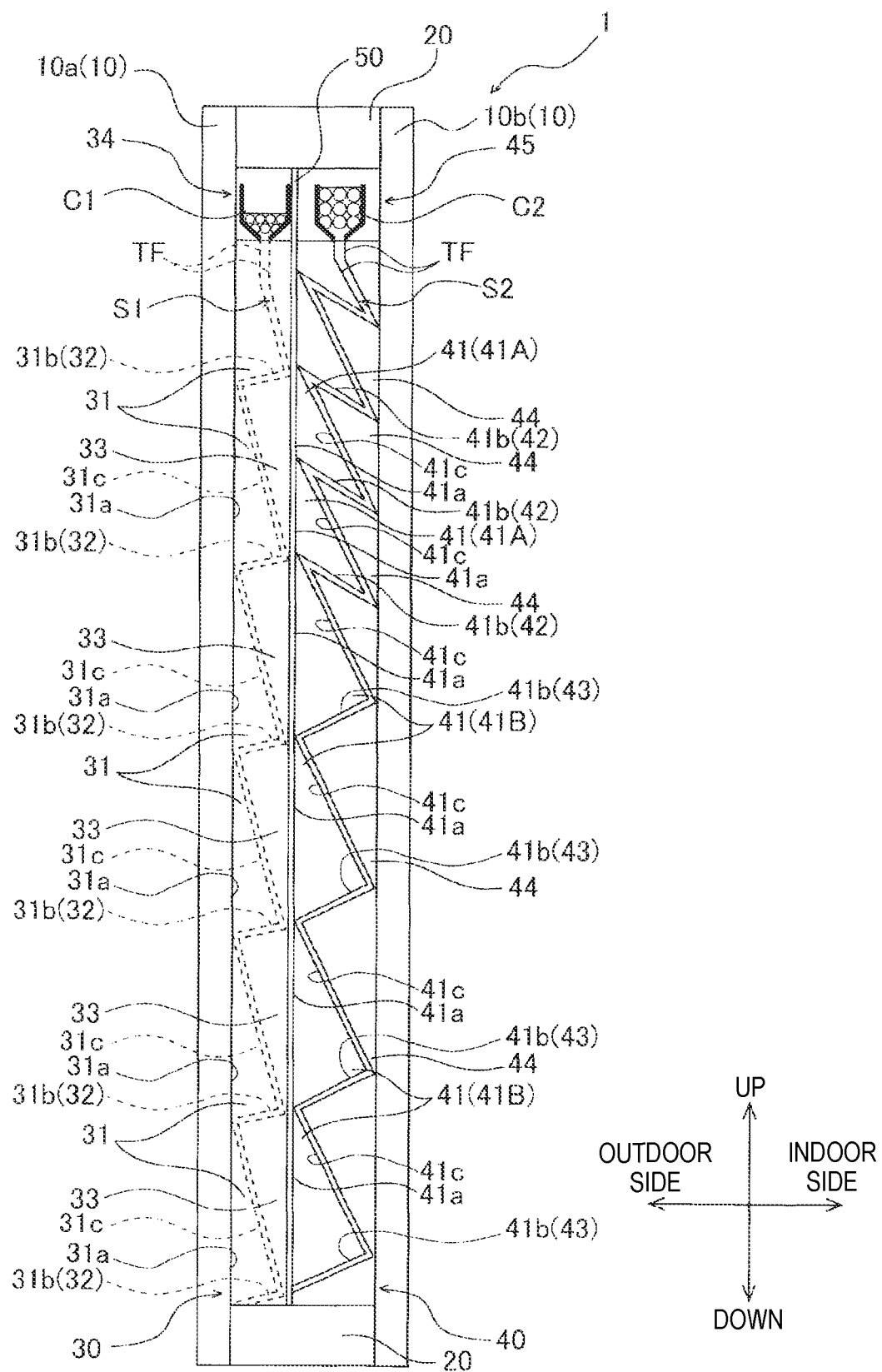
FIG. 1 is a cross-sectional view showing a multi-stage prism window according to a first embodiment.

FIG. 1 is a cross-sectional view showing a multi-stage prism window according to a first embodiment. A multi-stage prism window 1 shown in FIG. 1 schematically includes: two transparent plate members 10; a sealing member 20; a first prism element 30; a second prism element 40; and an intermediate plate member 50 which is formed of a transparent flat plate. The first prism element 30 and the second prism element 40 are spaced apart by the transparent intermediate plate member 50.

The first prism element 30 includes two transparent thin films TF which are formed in zigzag shapes, and a soft transparent resin material is filled on two sides of the two thin films TF. A plurality of first prisms 31 are formed on an outdoor side of the two thin films TF, and a plurality of image restoration prisms 33 are formed on an indoor side. Strictly speaking, the first prisms 31 and the image restoration prisms 33 include not only the transparent resin material but also the thin films TF.

Space (first space S1) is formed between the two thin films TF. Therefore, the first space S1 is in contact with the first prism 31 from the indoor side, and in contact with the image restoration prism 33 from the outdoor side. The first prism element 30 further includes: a plurality of reflective members (opaque members) 32; and a liquid control mechanism 34. The liquid control mechanism 34 fills the first space S1 with water (liquid) and drains water from the first space S1.

Similarly to the first prism element 30, the second prism element 40 also includes: two transparent thin films TF which are formed in zigzag shapes, and the soft transparent resin material is also filled on two sides of the two thin films TF. A plurality of second prisms 41 are formed on the outdoor side of the two thin films TF, and a plurality of image restoration prisms 44 are formed on the indoor side. Strictly speaking, the first prisms 31 and the image restoration prisms 33 include not only the transparent resin material but also the thin films TF.

Space (second space S2) is formed between the two thin films TF. Therefore, the second space S2 is in contact with the second prism 41 from the indoor side, and in contact with the image restoration prism 44 from the outdoor side. The second prism element 40 further includes: a plurality of reflective members 42; a plurality of endothermic members 43; and a liquid control mechanism 45. The liquid control mechanism 45 fills the second space S2 with water and drains water therefrom.

Although each of the prisms 31, 33, 41, 44 includes the soft resin whose shape is defined by the transparent thin film TF in the first embodiment, the present invention is not limited thereto, and each of the prisms 31, 33, 41, 44 may also be formed of a solid or the like without the thin film TF, for example. Further, the thin film TF is preferably a polyethylene terephthalate (PET) film from the viewpoint of durability and bendability, and more preferably, the thin film TF is subjected to low reflection treatment so as to prevent Fresnel reflection.

Hereinafter, each portion will be described in detail. The two transparent plate members 10 are made of transparent plate materials such as glass materials or resin materials which are arranged substantially parallel to each other. The two transparent plate members includes a first transparent plate member 10a and a second transparent plate member 10b. The first transparent plate member 10a is arranged on the outdoor side, and the second transparent plate member 10b is arranged on the indoor side of the first transparent plate member 10a.

The sealing member 20 is interposed between the two transparent plate members 10 at peripheral end portions of the two transparent plate members 10. By providing the sealing member 20 at the peripheral end portions of the two transparent plate members 10, an internal space which is closed by the two transparent plate members 10 and the sealing member 20 is formed, and the first and second prism elements 30, 40 are provided in such an internal space.

The plurality of first prisms 31 of the first prism element 30 are arranged in the internal space between the first transparent plate member 10a and the second transparent plate member 10b, and each of the first prisms 31 is a prism made of a transparent member which has a triangular shape in cross section (that is, a prism having a triangular prism shape). A first side 31a of each first prism 31 is arranged to face the first transparent plate member 10a in a manner that the first side 31a extends along the first transparent plate member 10a (in the first embodiment, the first prism 31 is in contact with the first transparent plate member 10a). A second side 31b and a third side 31c of the first prism 31 extend at predetermined angles with respect to the first side 31a. The second side 31b is located vertically below the third side 31c. In a case where the first prism 31 is made of a solid or the like, the first prism 31 may be slightly spaced apart from the first transparent plate member 10a.

The reflective member 32 is a member that does not allow transmission of sunlight, and is configured to block an optical path to interior of a room. In the present embodiment, the reflective member 32 is, for example, a member having a reflectivity of 70% or more for visible light and infrared light. The reflective member 32 is formed by white or silver coating provided on the second side 31b (predetermined surface) of the first prism 31, and is more preferably water coloring ink coating, which becomes transparent when wet with water and becomes white or silver when dried, provided on the side of the first space S1 of the thin film TF.

The plurality of image restoration prisms 33 are arranged between the first transparent plate member 10a and the second transparent plate member 10b, and are arranged to fill space between the two thin films TF and the intermediate plate member 50. The image restoration prisms 33 prevent scenery distortion caused by the first prism 31 when the scenery is viewed from the interior of the room.

The liquid control mechanism 34 is formed of a polymer provided at an upper portion of the first prism element 30. The polymer is accommodated in a container C1. An opening is provided in a bottom portion of the container C1. The opening is connected to the first space S1. The polymer changes in accordance with temperature between a state where water absorption is exhibited and a state where the water absorption is not exhibited. More specifically, the polymer is a sulfobetaine polymer, poly (allylamine-co-allylurea) (PAU), or the like that exhibits the water absorption above an upper critical solution temperature (first specific temperature) and exhibits hydrophobicity below the upper critical solution temperature. A sufficient amount of the polymer is provided. The polymer absorbs water and the water is drained from the first space S1 when the water absorption is exhibited. The water is released and the first space S1 is filled with the water in the state where the hydrophobicity is exhibited.

The plurality of second prisms 41 of the second prism element 40 are arranged on the indoor side of the first prism 31 in the internal space between the two transparent plate members 10, and each of the second prisms 41 is a prism made of a transparent member which has a triangular shape in cross section (that is, a prism having a triangular prism shape). A first side 41a of each second prism 41 is arranged along the flat plate-shaped intermediate plate member 50 (in the first embodiment, the second prism 41 is in contact with the intermediate plate member 50). A second side 41b and a third side 41c of the second prism 41 extend at predetermined angles with respect to the first side 41a. The second side 41b is located vertically below the third side 41c. In a case where the second prism 41 is made of a solid or the like, the second prism 41 may be slightly spaced apart from the intermediate plate member 50.

Here, the second prism 41 includes: a reflective prism 41A which is used for reflection; and an endothermic prism 41B which is used for absorbing heat. The reflective prism 41A has a shape that is different from that of the endothermic prism 41B, and has an obtuse triangular shape in cross section. An obtuse angle portion of the reflective prism 41A faces the outdoor side. The second side 41b, which is a lower side of the reflective prism 41A, is slightly inclined toward the indoor side. Meanwhile, the endothermic prism 41B has a right angle triangular shape or a triangular shape having an angle portion close to a right angle in cross section, and a right angle portion thereof (or the angle portion close to the right angle) faces the indoor side. The reflective prism 41A is provided with a reflective member 42, and the endothermic prism 41B is provided with an endothermic member 43.

The reflective member 42 is a member similar to the reflective member 32 of the first prism element 30, and is, for example, a member having a reflectivity of 70% or more for visible light and infrared light in the present embodiment. The reflective member 42 is formed by white or silver coating provided on the second side 41b (predetermined surface) of the reflective prism 41A, and is more preferably water coloring ink coating, which becomes transparent when wet with water and becomes white or silver when dried, provided on the side of the second space S2 of the thin film TF.

The endothermic member 43 is, for example, a member having an absorption rate of 70% or more for visible light and infrared light, for example, a selective absorption member having a large absorption rate in a solar wavelength range (0.3 to 2.5 μm) and small emissivity in an infrared wavelength range (3.0 to 20 pin). The endothermic member 43 is formed by black coating provided on the second side 41b (predetermined surface) of the endothermic prism 41B, and is more preferably photochromic ink coating that reacts and develops black color upon receiving direct light from the sun. Since ultraviolet rays are cut in a case where the thin film TF of the first prism element 30 is a PET film, it is preferable to adopt photochromic ink coating that has high response to visible light.

Each image restoration prism 44 is arranged between the first transparent plate member 10a and the second transparent plate member 10b, and is arranged to fill space between the two thin films TF and the second transparent plate member 10b. Each image restoration prism 44 prevents scenery distortion caused by the second prism 41 when the scenery is viewed from the interior of the room.

The liquid control mechanism 45 is formed of a polymer provided at an upper portion of the second prism element 40. The polymer is accommodated in a container C2. An opening is provided in a bottom portion of the container C2. The opening is connected to the second space S2. The polymer changes in accordance with temperature between a state where water absorption is exhibited and a state where water absorption is not exhibited. More specifically, the polymer is N-isopropylacrylamide (NIPA) gel or the like that exhibits the water absorption below a lower critical solution temperature (second specific temperature) and exhibits hydrophobicity above the lower critical solution temperature. A sufficient amount of the polymer is provided. The polymer absorbs water and the water is drained from the second space S2 when the water absorption is exhibited. The water is released and the second space S2 is filled with the water in the state where the hydrophobicity is exhibited.

Hereinafter, it is assumed that the upper critical solution temperature of the polymer included in the liquid control mechanism 34 of the first prism element 30 and the lower critical solution temperature of the polymer included in the liquid control mechanism 45 of the second prism element 40 are the same. However, the upper critical solution temperature and the lower critical solution temperature are not limited to the same temperature, and may also be different. Therefore, for example, the first space S1 and the second space S2 may both be filled with water.

FIG. 1 shows an example in which the first space S1 is filled with water and water is drained from the second space S2. In a case when the first space S1 is filled with water, a total reflection condition of light on the third side 31c of the first prism 31 is different as compared with a case when water is drained from the first space S1.

Figure 2:
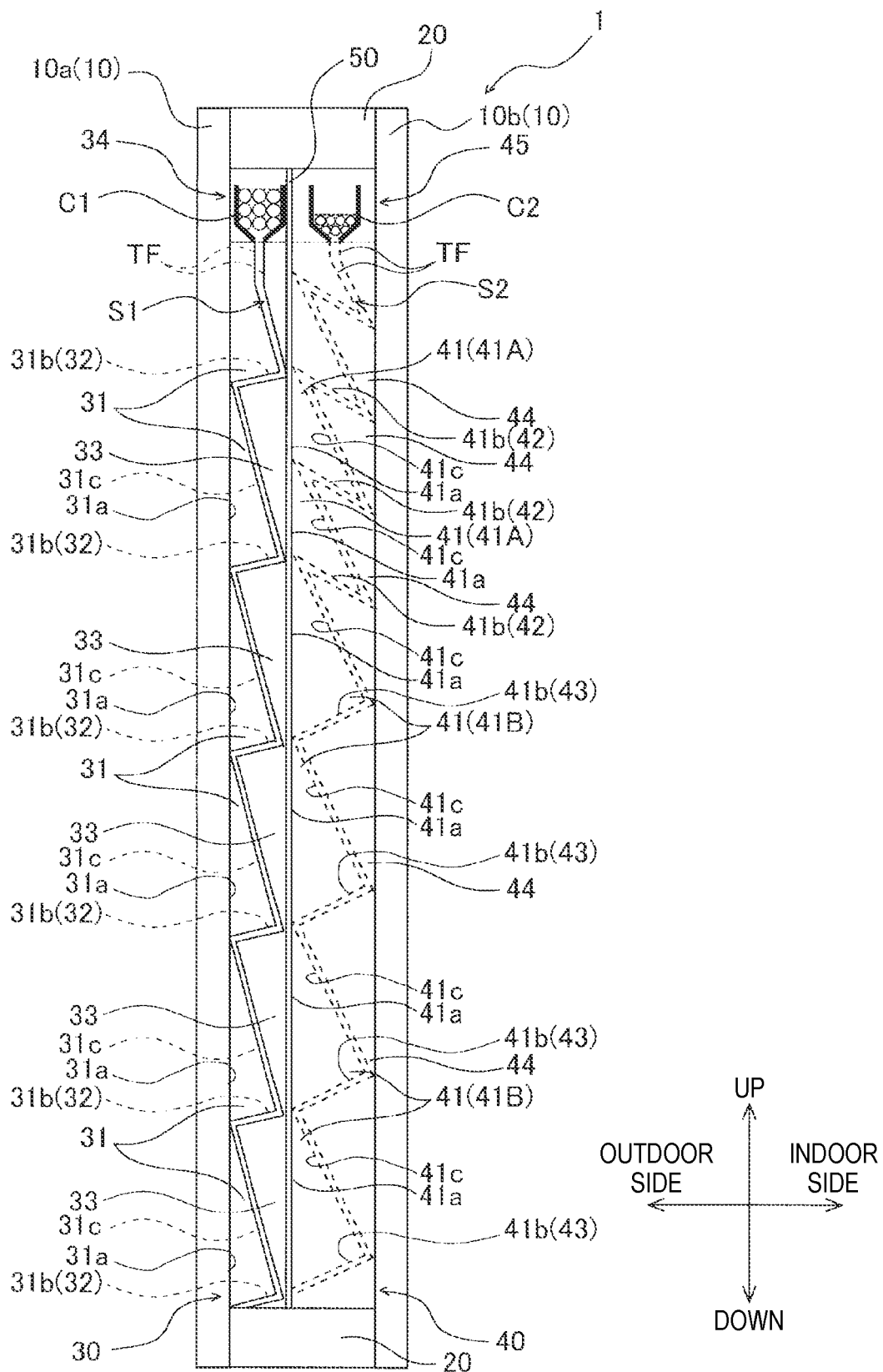
FIG. 2 is a cross-sectional view showing a state where a second space is filled with water while water is drained from a first space.

FIG. 2 is a cross-sectional view showing a state where the second space S2 is filled with water while water is drained from the first space S1. In a case when the second space S2 is filled with water, a total reflection condition of light on the third side 41c of the second prism 41 is different as compared with a case when water is drained from the second space S2.

Figure 3A:
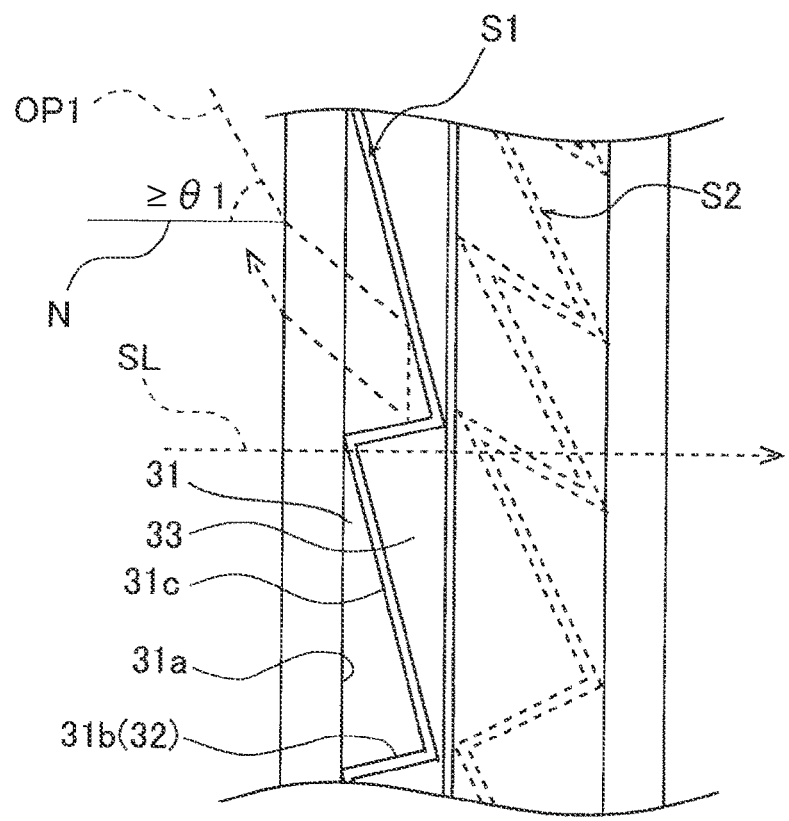
FIGS. 3A and 3B are conceptual diagrams showing an optical path of direct light incident on the multi-stage prism window according to the first embodiment.
Figure 3B:
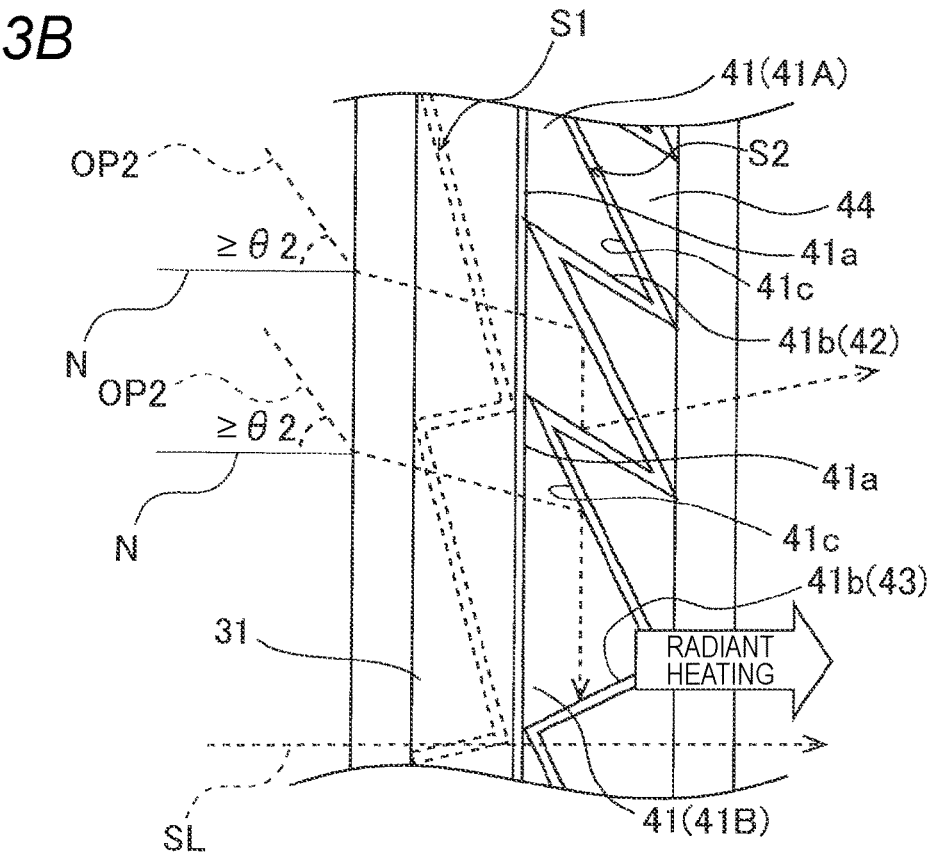

FIGS. 3A and 3B are conceptual diagrams showing an optical path of direct light incident on the multi-stage prism window 1 according to the first embodiment. FIG. 3A shows the optical path when the first space S1 is not filled with water while the second space S2 is filled with water, and FIG. 3B shows the optical path when the first space S1 is filled with water while the second space S2 is not filled with water.

As shown in FIG. 3A, in the present embodiment, in a case where the first space S1 is a void with no water filled therein, a refractive index and interior angles of the triangular shape of the first prism 31 are set such that direct light OP1 (for example, direct light in summer) whose angle with respect to a normal line N of the two transparent plate members 10 is equal to or larger than a first predetermined angle θ1 (for example, 45 degrees) is condensed on the reflective member 32 and retroreflected. Specifically, the refractive index and the interior angles of the triangular shape of the first prism 31 are set such that an incident angle of the direct light OP1 on the third side 31c is equal to or larger than a critical angle.

Further, in the case where the first space S1 is a void with no water filled therein, the refractive index and the interior angles of the triangular shape of the first prism 31 are set such that transmission of light (direct light OP2 to be described later below and light SL such as light reflected from ground) whose angle with respect to the normal line N is less than the first predetermined angle θ1 is allowed.

Although the direct light OP1 shown in FIG. 3A reaches the third side 31c of the first prism 31 first, direct light that reaches the second side 31b first is also retroreflected in the same way as long as the refractive index and the interior angles of the triangular shape are set as described above.

As shown in FIG. 3B, in the present embodiment, in a case where the second space S2 is a void with no water filled therein, a refractive index and interior angles of the triangular shape of the reflective prism 41A of the second prism 41 are set such that the direct light OP2 (for example, direct light in winter) whose angle with respect to the normal line N is equal to or larger than a second predetermined angle θ2 (for example, 28 degrees) is condensed on the reflective member 42 and reflected to an indoor ceiling side.

Further, in the case where the second space S2 is a void with no water filled therein, a refractive index and interior angles of the triangular shape of the endothermic prism 41B of the second prism 41 are set such that the direct light OP2 whose angle with respect to the normal line N is equal to or larger than the second predetermined angle θ2 is condensed on the endothermic member 43 and used for indoor heating.

Further, in the case where the second space S2 is a void with no water filled therein, the refractive indexes and the interior angles of the triangular shapes of the reflective prism 41A and the endothermic prism 41B are set such that transmission of light (the light SL such as light reflected from the ground) whose angle with respect to the normal line N is less than the second predetermined angle θ2 is allowed.

Next, an operation of the multi-stage prism window 1 according to the first embodiment will be described with reference to FIGS. 1 to 3B.

First, in a warm environment such as summer, an ambient temperature is equal to or higher than the upper critical solution temperature of the polymer included in the liquid control mechanism 34 and equal to or higher than the lower critical solution temperature of the polymer included in the liquid control mechanism 45. Therefore, the polymer included in the liquid control mechanism 34 exhibits hydrophilicity and absorbs water such that the water is drained from the first space S1. Meanwhile, the polymer included in the liquid control mechanism 45 exhibits hydrophobicity and releases water such that the second space S2 is filled with the water. As a result, the multi-stage prism window 1 is as shown in FIGS. 2 and 3A.

In such a state, it is assumed that the direct light OP1 whose angle with respect to the normal line N is equal to or larger than the first predetermined angle θ1 is incident on the first transparent plate member 10a. At this time, the direct light OP1 passes through the first transparent plate member 10a and reaches the first prism 31.

The direct light OP1 reaching the first prism 31 is in accordance with the following 1) to 3). 1) The direct light OP1 is totally reflected only by the third side 31c and reaches the reflective member 32 provided with respect to the second side 31b. 2) The direct light OP1 is totally reflected by the third side 31c, then totally reflected by the first side 31a and reaches the reflective member 32 provided with respect to the second side 31b. 3) The direct light OP1 directly reaches the reflective member 32 provided with respect to the second side 31b. All of these types of light are retroreflected through using reflection at the reflective member 32. That is, the light is emitted from the first transparent plate member 10a toward the sun.

When light whose angle with respect to the normal line N is less than the first predetermined angle θ1 is incident on the first transparent plate member 10a, the light passes through the first prism 31 and the image restoration prism 33 and also passes through the second prism element 40 so as to reach the indoor side.

On the other hand, in a cold environment such as winter, the ambient temperature is lower than the upper critical solution temperature of the polymer included in the liquid control mechanism 34 and lower than the lower critical solution temperature of the polymer included in the liquid control mechanism 45. Therefore, the polymer included in the liquid control mechanism 34 exhibits hydrophobicity and releases water such that the first space S1 is filled with the water. Meanwhile, the polymer included in the liquid control mechanism 45 exhibits hydrophilicity and absorbs water such that the water is drained from the second space S2. As a result, the multi-stage prism window 1 is as shown in FIGS. 1 and 3B.

In such a state, it is assumed that the direct light OP2 whose angle with respect to the normal line N is equal to or larger than the second predetermined angle θ2 is incident on the first transparent plate member 10a. At this time, the direct light OP2 passes through the first prism element 30 and reaches the second prism 41.

The direct light OP2 reaching the reflective prism 41A of the second prisms 41 is in accordance with: 1) being totally reflected only by the third side 41c and reaching the reflective member 42 provided with respect to the second side 41b, 2) being totally reflected by the third side 41c, then being totally reflected by the first side 41a and reaching the reflective member 42 provided with respect to the second side 41b, and 3) directly reaching the reflective member 42 provided with respect to the second side 41b. All of these types of light are reflected to the indoor ceiling side through using reflection at the reflective member 42. That is, the light is emitted from the second transparent plate member 10b toward the ceiling side.

The direct light OP2 reaching the endothermic prism 41B of the second prism 41 is in accordance with the following 1) to 3). 1) The direct light OP2 is totally reflected only by the third side 41c and reaches the endothermic member 43 provided with respect to the second side 41b. 2) The direct light OP2 is totally reflected by the third side 41c, then totally reflected by the first side 41a and reaches the endothermic member 43 provided with respect to the second side 41b. 3) The direct light OP2 directly reaches the endothermic member 43 provided with respect to the second side 41b. All of these types of light are thermally absorbed by the endothermic member 43 and are transmitted to the second transparent plate member 10b so as to perform radiant heating on the indoor side.

As described above, in the case where the ambient temperature is high, the direct light OP1 whose angle is equal to or larger than the first predetermined angle θ1 is retroreflected and an interior of a room is not heated. In the case where the ambient temperature is low, the direct light OP2 whose angle is equal to or larger than the second predetermined angle θ2 can be reflected to the indoor ceiling side and subjected to heat absorption so as to be used indoors.

In this way, according to the multi-stage prism window 1 according to the first embodiment, since the liquid control mechanisms 34, 45 which are configured to fill at least one of the first space S1 and the second space S2 with the water is provided, a total reflection condition of the first prism 31 or the second prism 41 (reflection conditions of surfaces other than the second sides 31b, 41b) can be changed when the first space S1 or the second space S2 is filled with the water such that a function of the first prism 31 or a function of the second prism 41 is not exhibited. Therefore, for example, if any one of the spaces S1, S2 is filled with liquid in accordance with temperature, for example, without depending on solar altitude, the functions of the first prism 31 and the second prism 41 can be selectively exhibited. Therefore, the state where the direct light OP1, OP2 is not directly used indoors or the state where the direct light OP1, OP2 is used indoors can be optimized without depending on seasons.

The polymer that changes in accordance with the temperature between the state where water absorption is exhibited and the state where water absorption is not exhibited is provided. The water is absorbed from the first space S1 or the second space S2 or the water is filled in the first space S1 or the second space S2 through using the change in the state of the polymer. In this way, control can be performed based on the temperature through using the polymer, and the state where the direct light OP1, OP2 is not directly used indoors or the state where the direct light OP1, OP2 is used indoors can be further optimized without depending on the seasons.

Figure 4:
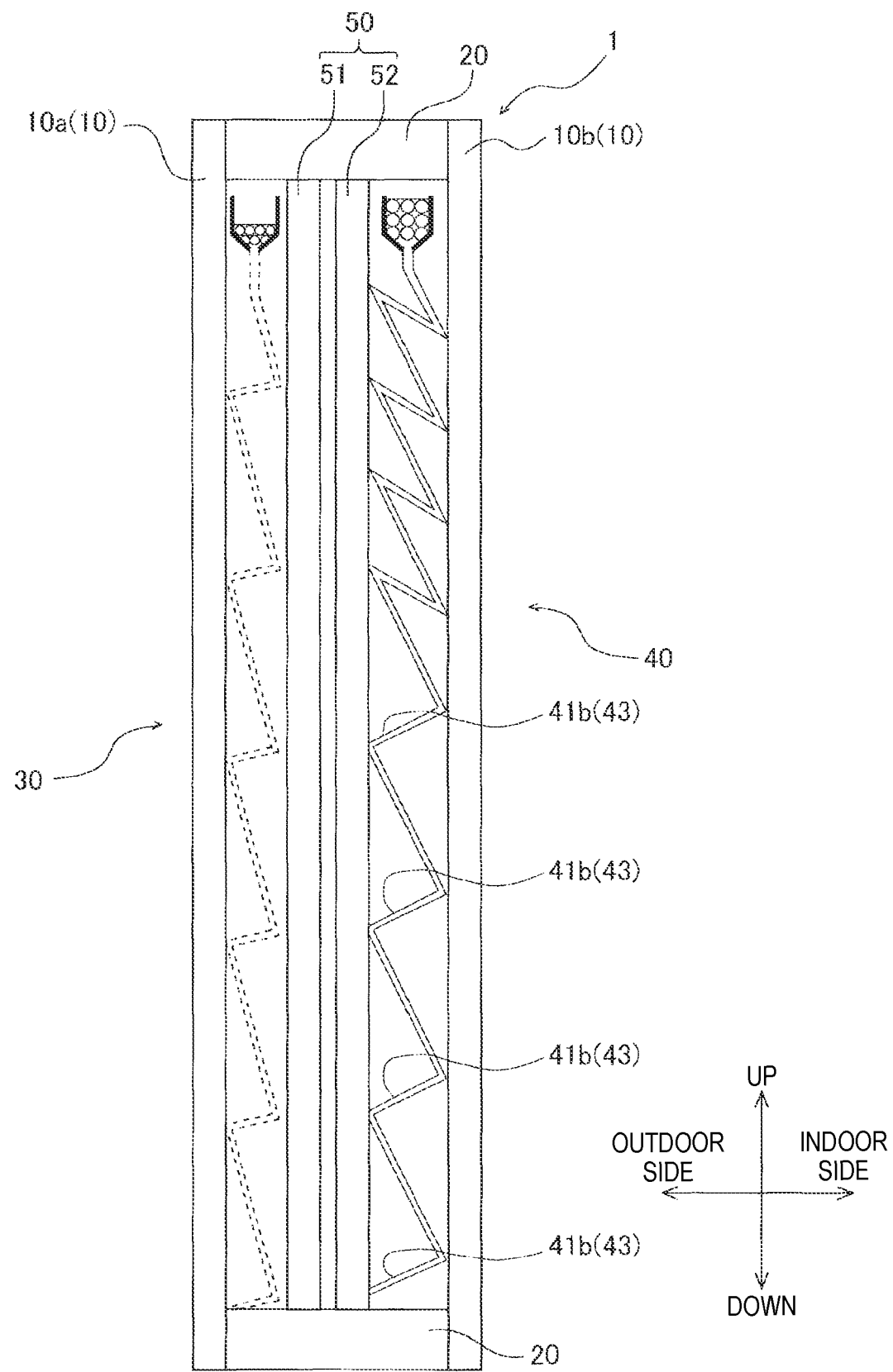
FIG. 4 is a cross-sectional view showing a modification of the multi-stage prism window according to the first embodiment.

The multi-stage prism window 1 according to the first embodiment may also be configured as shown in FIG. 4. FIG. 4 is a cross-sectional view showing a modification of the multi-stage prism window 1 according to the first embodiment. As shown in FIG. 4, the multi-stage prism window 1 according to the modification includes a first plate member 51 and a second plate member 52, which have flat plate shapes, as the intermediate plate member 50. A vacuum state is formed between the first plate member 51 and the second plate member 52, and the first prism element 30 and the second prism element 40 are thermally insulated from each other. As a result, heat of the endothermic member 43 is less likely to escape toward the first prism element 30, and an effect of indoor use thereof can be further improved.

Next, a second embodiment of the present invention will be described. A multi-stage prism window according to the second embodiment is the same as that of the first embodiment except that a part of the configuration is different. In the following description, elements that are the same as or similar to those of the first embodiment are denoted by the same reference numerals, or a description thereof is omitted without giving reference numerals.

Figure 5:
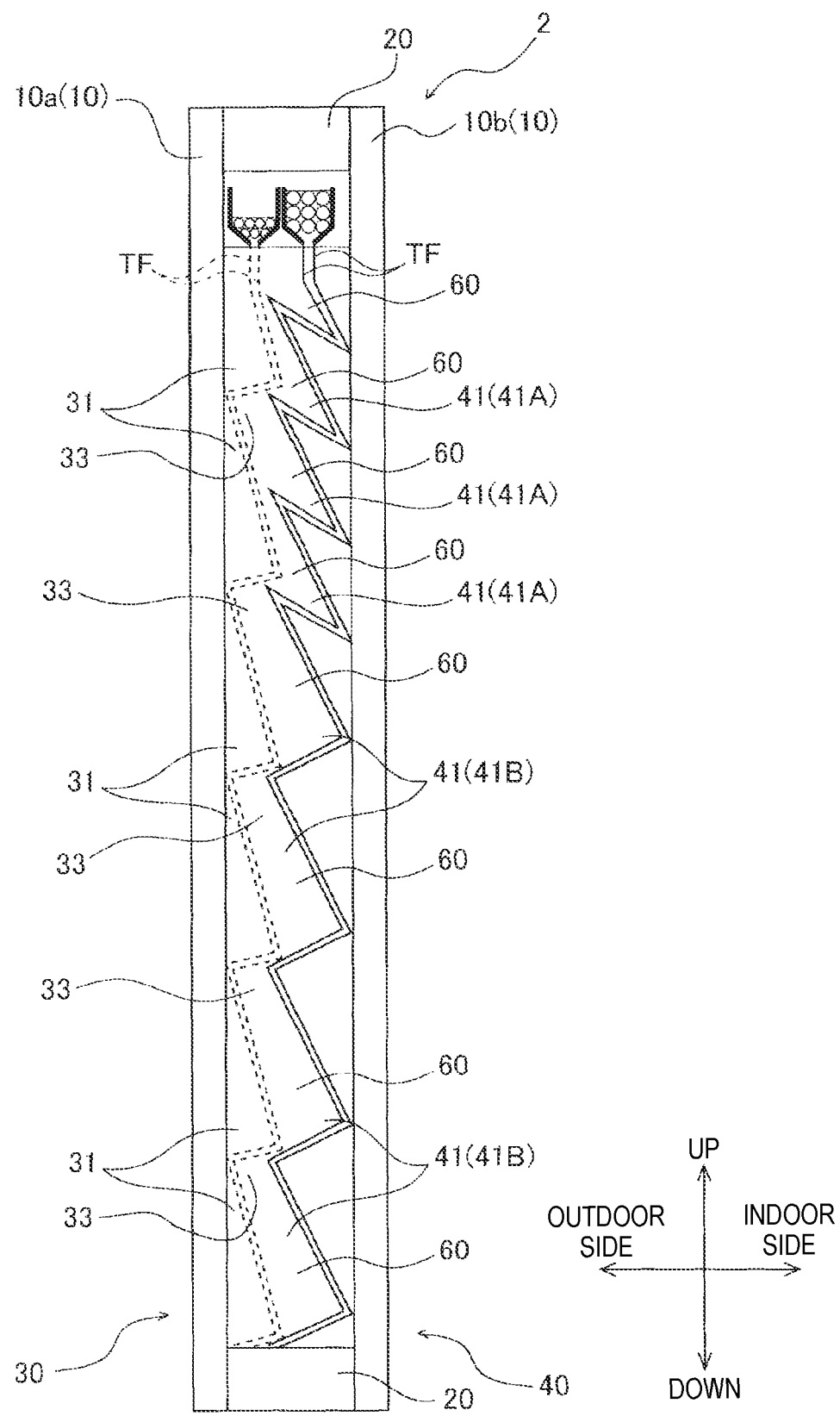
FIG. 5 is a cross-sectional view showing a multi-stage prism window according to a second embodiment.

FIG. 5 is a cross-sectional view showing the multi-stage prism window according to the second embodiment. A multi-stage prism window 2 shown in FIG. 5 is similar to the first embodiment in that the two transparent plate members 10, the sealing member 20, the first prism element 30 and the second prism element 40 are schematically included. The multi-stage prism window 2 is different from the first embodiment in that an intermediate prism 60 is provided instead of the intermediate plate member 50.

The intermediate prism 60 is made of a soft transparent resin material filled between the thin film TF of the first prism element 30 and the thin film TF of the second prism element 40 (strictly speaking, the intermediate prism 60 is constituted by the thin films TF and the soft transparent resin material). An outdoor side of the intermediate prism 60 has a shape along the first prism 31 and constitutes the image restoration prism 33 shown in the first embodiment. Meanwhile, an indoor side of the intermediate prism 60 forms the second prism 41.

With such a configuration, the intermediate plate member 50 is not provided and the number of prisms is reduced, so that the number of components is reduced. Since the intermediate plate member 50 is not provided, a thickness of the invention is also reduced.

The optical paths and operations of the direct light OP1, OP2 (see FIGS. 3A and 3B) of the multi-stage prism window 2 according to the second embodiment are the same as those of the first embodiment.

Figure 6:
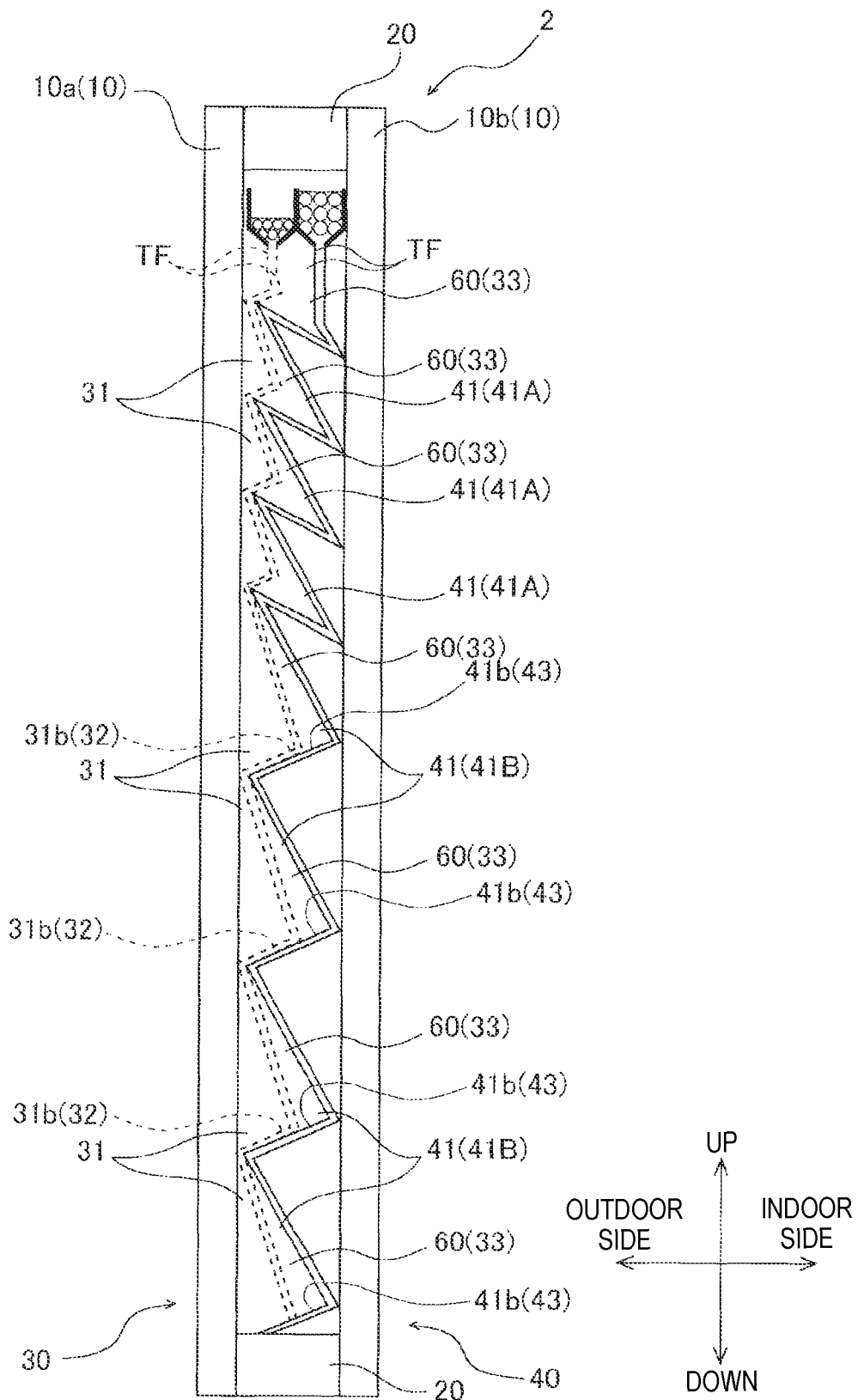
FIG. 6 is a cross-sectional view showing a modification of the multi-stage prism window according to the second embodiment.

FIG. 6 is a cross-sectional view showing a modification of the multi-stage prism window 2 according to the second embodiment. As shown in FIG. 6, in the multi-stage prism window 2 according to the modification, the second side 31b of the first prism 31 where the reflective member 32 is provided and the second side 41b of the endothermic prism 41B where the endothermic member 43 is provided are in a parallel and mounted state.

Here, in an example shown in FIG. 5, angles formed by the second side 31b of the first prism 31 and the second side 41b of the endothermic prism 41B are relatively close. Therefore, as shown in FIG. 6, since the sides 31b, 41b are in the parallel and mounted state, a shape of the intermediate prism 60 between the first prism 31 and the endothermic prism 41B can be simplified, thereby facilitating manufacture of the multi-stage prism window 2.

It should be noted that the angle of the second side 31b of the first prism 31 is changed to match the angle of the second side 41b of the endothermic prism 41B in the modification. Therefore, retroreflection is somewhat weakened (since it becomes impossible to emit the light at substantially the same angle as an incident angle of the direct light OP1). Therefore, the angle of the second side 41b of the endothermic prism 41B may be changed to match the angle of the second side 31b of the first prism 31 if the retroreflection is important.

In the modification, the intermediate prism 60 constitutes a part of the second prism 41, and a remaining portion is supplemented by the first prism 31. That is, in the modification, the second prism 41 is constituted by the first prism 31 and the intermediate prism 60. Therefore, it can be said that the second prism 41 is arranged on the indoor side of the first prism 31 in a state where a part of configuration of the second prism 41 is shared with the first prism 31. In this way, in the modification, the first prism 31 and the second prism 41 share a part of the configuration, which further contributes to reduction of thickness. In addition, the intermediate prism 60 according to the modification also serves as a part of the image restoration prism 33 with respect to the first prism 31.

In this way, according to the multi-stage prism window 2 according to the second embodiment, the state where the direct light OP1, OP2 is not directly used indoors or the state where the direct light OP1, OP2 is used indoors can be (further) optimized without depending on the seasons, which is similar to the first embodiment.

Further, according to the second embodiment, since the intermediate prism 60, which has the shape along the first prism 31 and forms whole or a part of the second prism 41, is further provided on the outdoor side, the image restoration prism 33 with respect to the first prism 31 and the second prism 41 can be shared, and the multi-stage prism window 2 whose number of components is reduced due to such sharing so as to contribute to thickness reduction can be provided.

Further, since the second side 31*b* of the first prism 31 where the reflective member 32 is provided and the second side 41*b* of the second prism 41 where the endothermic member 43 is provided are in the parallel and mounted state, a shape of the thin film TF and a shape of the intermediate prism 60 can be simplified and thus manufacturing can be facilitated.

Next, a third embodiment of the present invention will be described. A multi-stage prism window according to the third embodiment is the same as that of the second embodiment except that a part of the configuration is different. In the following description, the same or similar elements as those in the second embodiment are denoted by the same reference numerals, and descriptions thereof will be omitted.

Figure 7:
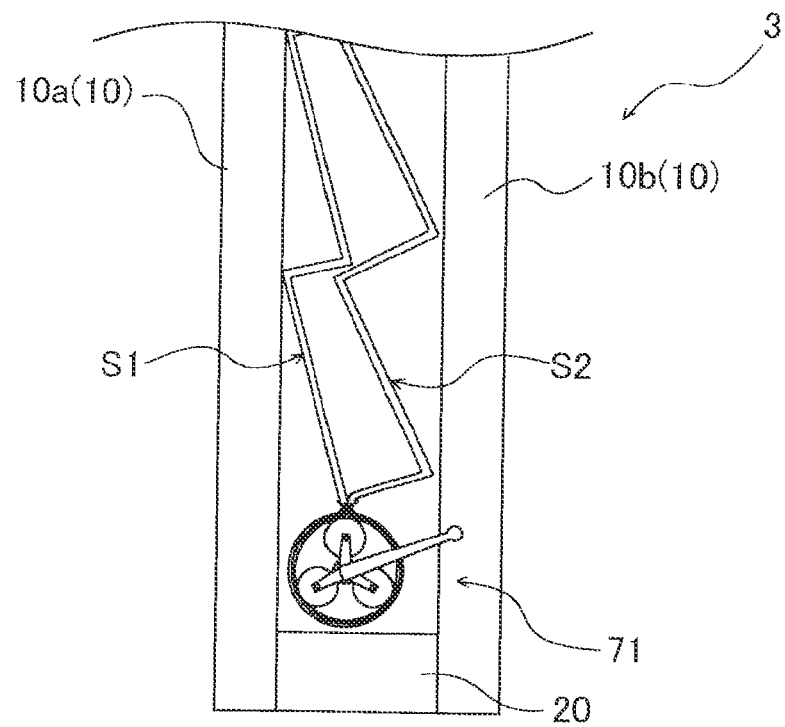
FIG. 7 is an enlarged cross-sectional view of a main part of a multi-stage prism window according to a third embodiment.

FIG. 7 is an enlarged cross-sectional view of a main part of the multi-stage prism window according to the third embodiment. A multi-stage prism window 3 shown in FIG. 7 includes a liquid control mechanism 71, which is different from that of the multi-stage prism window 2 according to the second embodiment. The liquid control mechanism 71 is provided at a lower portion of the internal space sandwiched between the two transparent plate members 10.

Figure 8:
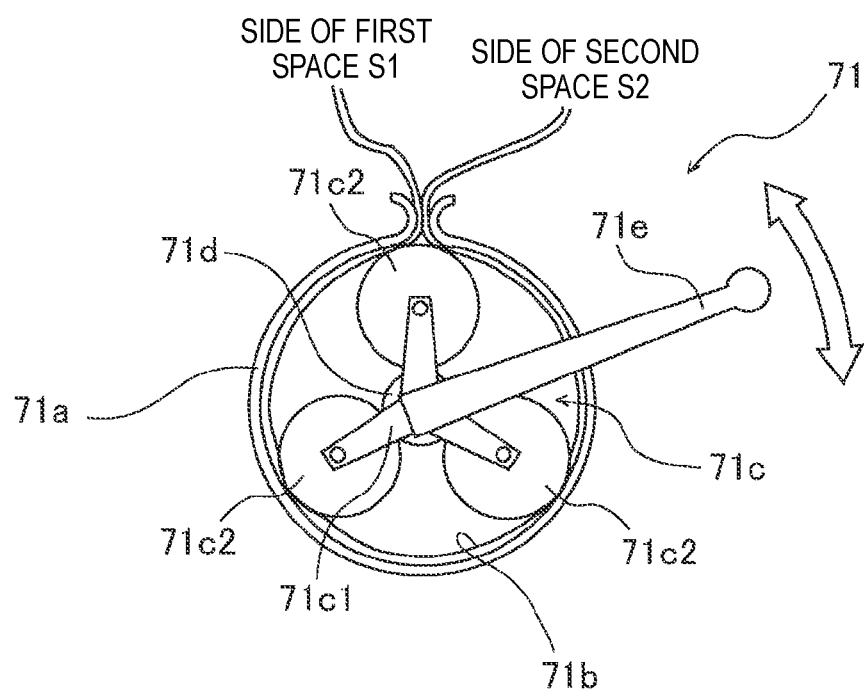
FIG. 8 is an enlarged side view of a liquid control mechanism shown in FIG. 7.
Figure 9:
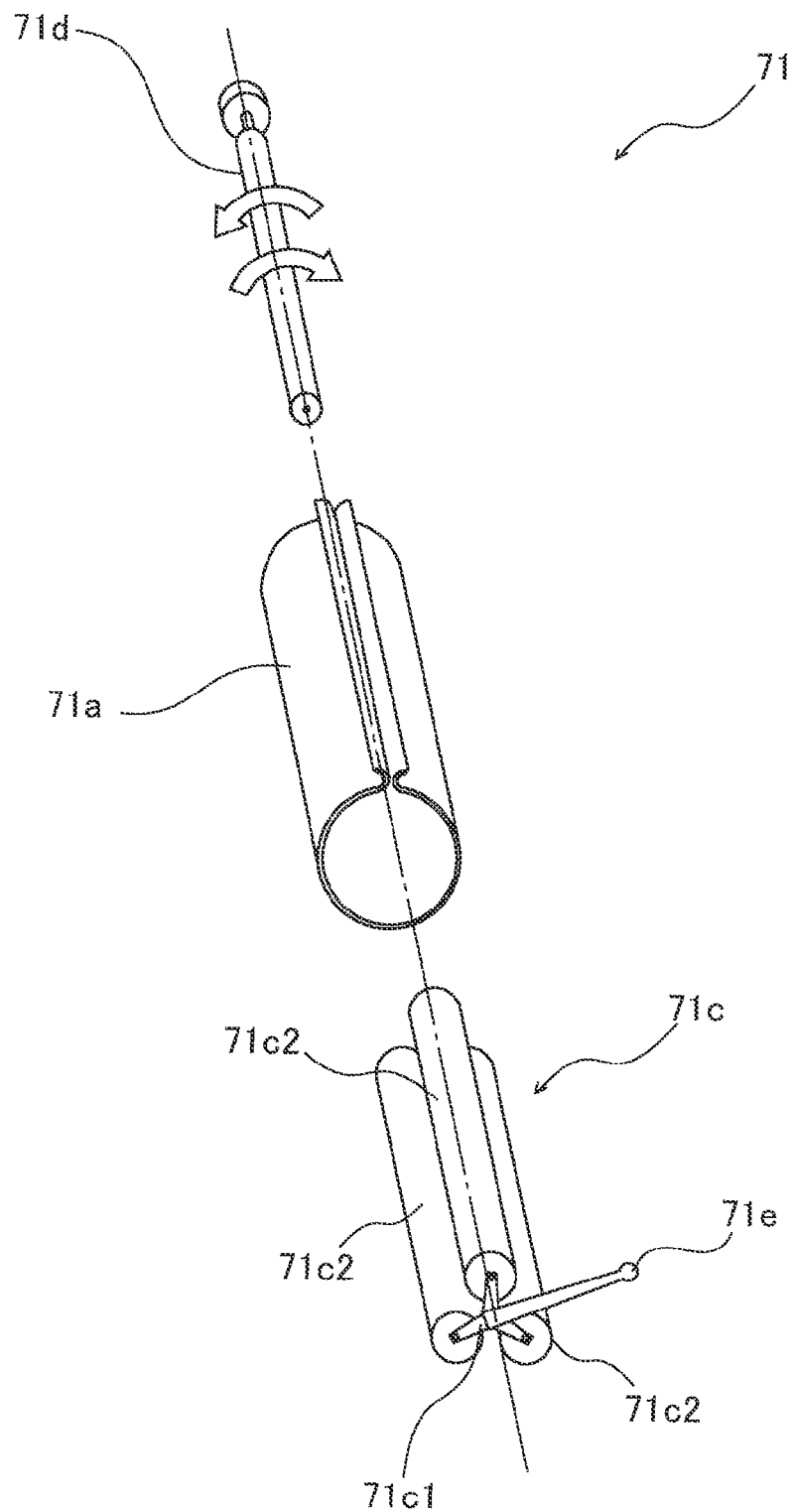
FIG. 9 is an exploded perspective view of the liquid control mechanism shown in FIG. 7.

FIG. 8 is an enlarged side view of the liquid control mechanism 71 shown in FIG. 7. FIG. 9 is an exploded perspective view of the liquid control mechanism 71 shown in FIG. 7. In FIG. 9, a part of configuration of the liquid control mechanism 71 is omitted.

As shown in FIGS. 8 and 9, the liquid control mechanism 71 includes: a pump case 71*a* which has a substantially cylindrical shape; and a flow channel 71*b* which connects the first and second spaces S1, S2. The flow channel 71*b* is arranged along an inner surface of the pump case 71*a* which has the substantially cylindrical shape. An upper end of the pump case 71*a* is opened, and the flow channel 71*b* is drawn out from this portion and connected to the first space S1 and the second space S2. The flow channel 71*b* is formed of a soft tube or the like.

The liquid control mechanism 71 further includes: a pump roller (pump unit) 71*c*; a driving roller 71*d*; and an operation lever 71*e*. The pump roller 71*c* includes a plurality of (three) individual rollers 71*c*2 which are circumferentially arranged via a carrier 71*c*1. The pump roller is pressed against the pump case 71*a* such that the soft flow channel 71*b* is flattened by the plurality of individual rollers 71*c*2.

The driving roller 71*d* is an electric roller provided at a position of a sun gear in a case where the plurality of individual rollers 71*c*2 are planetary gears of a planetary gear mechanism, and is rotatable leftward and rightward about a roller longitudinal direction which serves as an axis. The driving roller 71*d* has a power source such as a motor, and is configured to electrically rotate leftward and rightward based on an instruction, such as a switch operation, from a user. The driving roller 71*d* may also be automatically rotated leftward and rightward based on a signal from a temperature sensor. The driving roller 71*d* presses the plurality of individual rollers 71*c*2 and has the same shaft as the carrier 71*c*1. Therefore, when the driving roller 71*d* is rotated, the individual rollers 71*c*2 rotate accordingly and the pump roller 71*c* also rotates as a whole.

When the pump roller 71*c* is rotated as a whole and the individual rollers 71*c*2 are rotated, the plurality of individual rollers 71*c*2 narrows the flow channel 71*b* and transfers liquid from the first space S1 to the second space S2 or from the second space S2 to the first space S1. Further, the multi-stage prism window 3 according to the third embodiment includes a liquid having an amount that is only sufficient to fill one of the first space S1 and the second space S2 (the liquid is not limited to water, and preferably has a refractive index close to those of the prisms 31, 33, 41, 44). Therefore, the multi-stage prism window 3 according to the third embodiment has a configuration in which one of the first space S1 and the second space S2 is selectively filled with the liquid.

The tip end portion of the operation lever 71*e* is connected to the shaft of the pump roller 71*c* (that is, the same shaft as the driving roller 71*d*), and a rear end portion thereof is a rotatable operation portion. At least the rear end portion which serves as the operation portion of the operation lever 71*e* is arranged outside space closed by the two transparent plate members 10 and the sealing member 20. Therefore, the user can rotate the operation lever 71*e*. When the operation lever 71*e* is rotated, the pump roller 71*c* and the individual rollers 71*c*2 are also connected so as to rotate, so that the liquid can also be transferred manually.

The optical paths and operations of the direct light OP1, OP2 (see FIGS. 3A and 3B) of the multi-stage prism window 3 according to the third embodiment are the same as those of the first embodiment.

In this way, according to the multi-stage prism window 3 according to the third embodiment, the state where the direct light OP1, OP2 is not directly used indoors or the state where the direct light OP1, OP2 is used indoors can be (further) optimized without depending on the seasons, which is similar to the second embodiment. In addition, the multi-stage prism window 3 whose thickness is reduced can be provided.

Further, according to the third embodiment, since the pump roller 71*c* is provided to transfer the liquid from the first space S1 to the second space S2 and from the second space S2 to the first space S1, for example, one of the first space S1 and the second space S2 can be filled with the liquid while the other one is not filled by controlling an operation of the pump roller 71*c*, and the function of one of the first and second prisms 31, 41 can be prevented from being exerted. Therefore, by controlling the operation of the pump roller 71*c*, the state where the direct light OP1, OP2 is not directly used indoors or the state where the direct light OP1, OP2 is used indoors can be optimized without depending on the seasons.

Since the pump roller 71*c* uses an operation force from the user to transfer the liquid, it is not necessary to provide an electric device or the like on the window or in the vicinity thereof, and thus the configuration can be simplified.

Next, a fourth embodiment of the present invention will be described. A multi-stage prism window according to the fourth embodiment is the same as that of the third embodiment except that a part of the configuration is different. In the following description, the same or similar elements as those in the third embodiment are denoted by the same reference numerals, and descriptions thereof will be omitted.

Figure 10A:
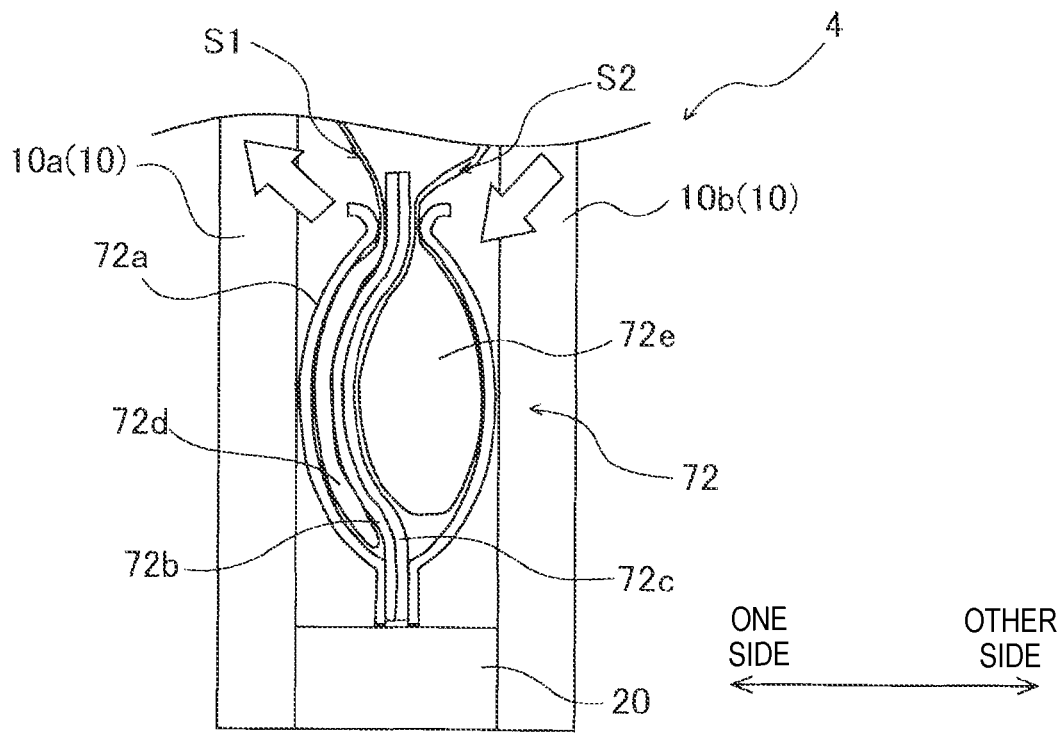
FIG. 10A and FIG. 10B are enlarged views showing a liquid control mechanism of a multi-stage prism window according to a fourth embodiment.
Figure 10B:
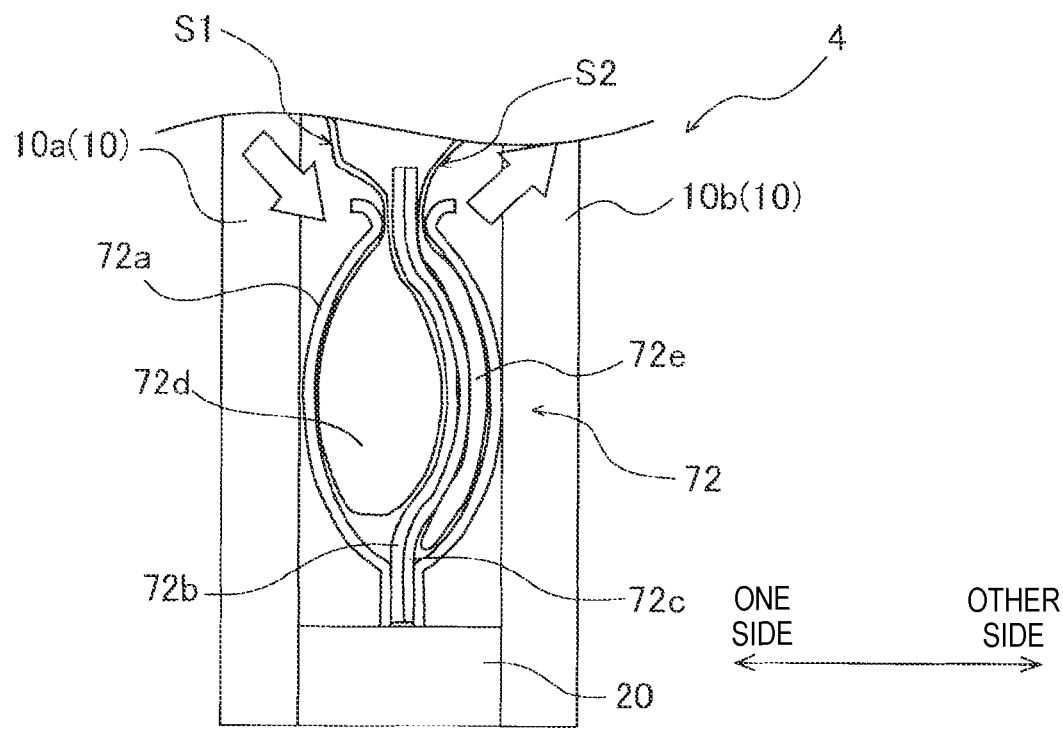

FIG. 10A and FIG. 10B are enlarged views showing a liquid control mechanism 72 of a multi-stage prism window 4 according to the fourth embodiment. FIG. 10A shows a first state, and FIG. 10B shows a second state. As shown in FIGS. 10A and 10B, the liquid control mechanism 72 includes: a case member 72*a*; two plate springs (face members) 72*b*, 72*c*; a first bag 72*d*; and a second bag 72*e*. The two plate springs 72*b*, 72*c* are formed of a shape memory plate spring (shape memory spring) 72*b* and a bias spring 72*c*.

The case member 72a is a rigid member whose outer shape is formed into a substantially rugby ball shape. The shape memory plate spring 72b, the bias spring 72c, the first bag 72d, and the second bag 72e are accommodated inside the case member 72a.

The shape memory plate spring 72b and the bias spring 72c are plate springs whose surfaces are attached to each other to form the face member. Upper and lower ends of the two plate springs 72b, 72c are restrained by the case member 72a. The first bag 72d is adjacent to the two plate springs 72b, 72c on one side of the two plate springs 72b, 72c whose surfaces are attached to each other, and can accommodate liquid therein. The first bag 72d communicates with the first space S1. The second bag 72e is adjacent to the two plate springs 72b, 72c on the other side of the two plate springs 72b, 72c, and can accommodate liquid therein. The second bag 72e communicates with the second space S2.

The shape memory plate spring 72b is shape-memorized so as to become hard at a temperature equal to or higher than a specific temperature (for example, 30 degrees) and become convex (protrude) to the other side. On the other hand, the shape memory plate spring 72b becomes soft at a temperature lower than the specific temperature.

The bias spring 72c is convex toward the one side in a natural state. The bias spring 72c overpowers the shape memory plate spring 72b and becomes convex toward the one side at a temperature lower than the specific temperature, and does not overpower the shape memory plate spring 72b and becomes convex toward the other side at a temperature equal to or higher than the specific temperature.

In such a liquid control mechanism 72, as shown in FIG. 10A, the first bag 72d is flattened by the case member 72a and the shape memory plate spring 72b when an ambient temperature is lower than the specific temperature such that the bias spring 72c overpowers the shape memory plate spring 72b and protrudes to the one side (when in a one side displacement state). Therefore, the liquid in the first bag 72d flows into the first space S1, and the first space S1 is filled with the liquid. Meanwhile, the second bag 72e is not flattened and the liquid is drained from the second space S2 to form a void in the second space S2.

In the liquid control mechanism 72, as shown in FIG. 10B, the second bag 72e is flattened by the case member 72a and the bias spring 72c when the ambient temperature is equal to or higher than the specific temperature such that the bias spring 72c does not overpower the shape memory plate spring 72b and protrudes to the other side (when in an other side displacement state). Therefore, the liquid in the second bag 72e flows into the second space S2, and the second space S2 is filled with the liquid. Meanwhile, the first bag 72d is not flattened and the liquid is drained from the first space S1 to form a void in the first space S1.

In this way, according to the multi-stage prism window 4 according to the fourth embodiment, the state where the direct light OP1, OP2 is not directly used indoors or the state where the direct light OP1, OP2 is used indoors can be (further) optimized without depending on the seasons, which is similar to the third embodiment. In addition, the multi-stage prism window 4 whose thickness is reduced can be provided.

Further, according to the fourth embodiment, since one of the first bag 72d or the second bag 72e is flattened by the shape memory plate spring 72b and the bias spring 72c to cause the liquid to flow into the first or second spaces S1, S2, control can be performed based on the temperature through using characteristics of the shape memory plate spring 72b, and the state where the direct light is not directly used indoors or the state where the direct light is used indoors can be further optimized without depending on the seasons.

Next, a fifth embodiment of the present invention will be described. A multi-stage prism window according to the fifth embodiment is the same as that of the third embodiment except that a part of the configuration is different. In the following description, the same or similar elements as those in the third embodiment are denoted by the same reference numerals, and descriptions thereof will be omitted.

Figure 11A:
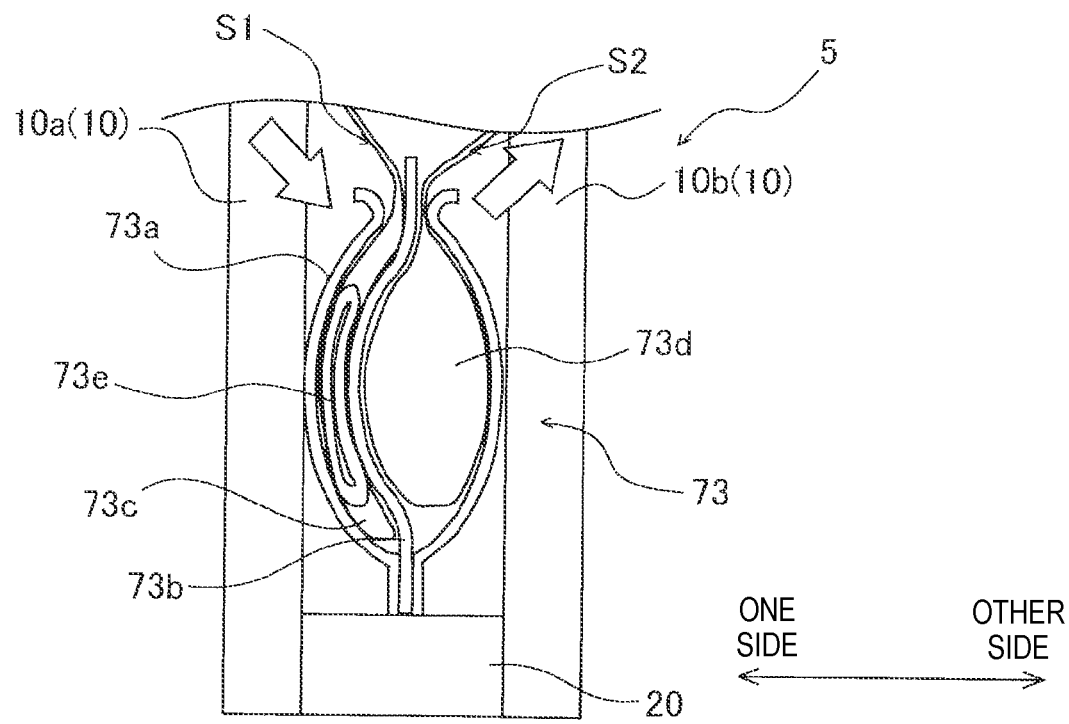
FIG. 11A and FIG. 11B are enlarged views showing a liquid control mechanism of a multi-stage prism window according to a fifth embodiment.
Figure 11B:
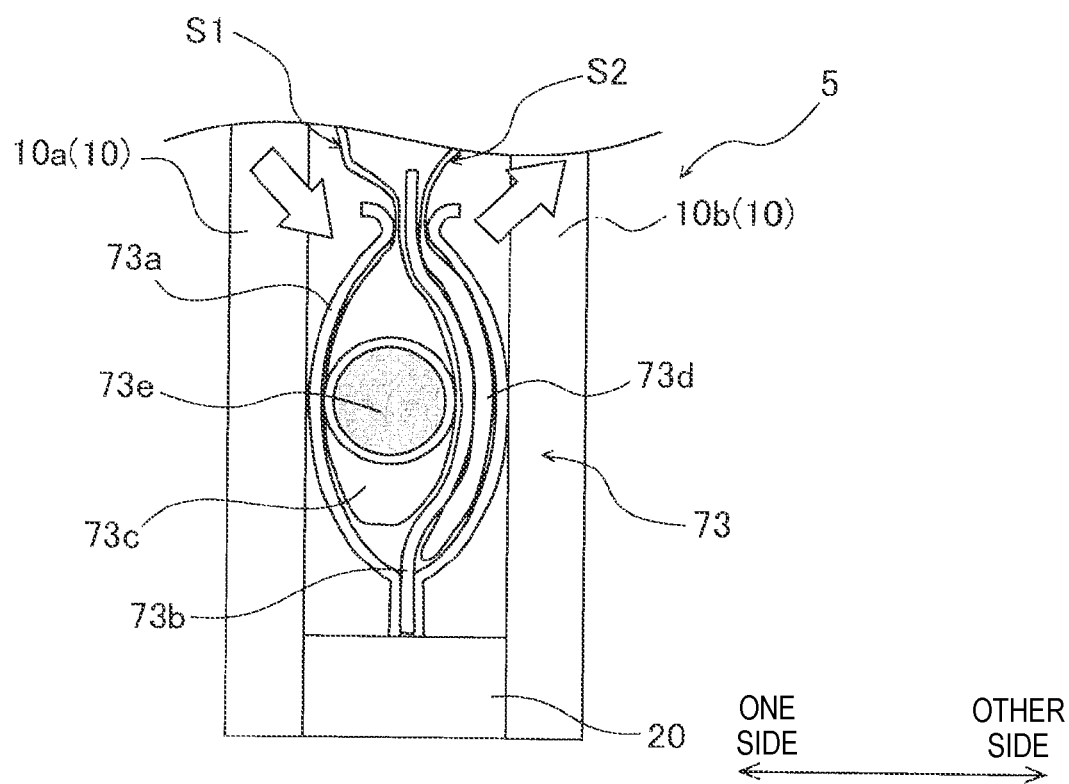
Figure 12:
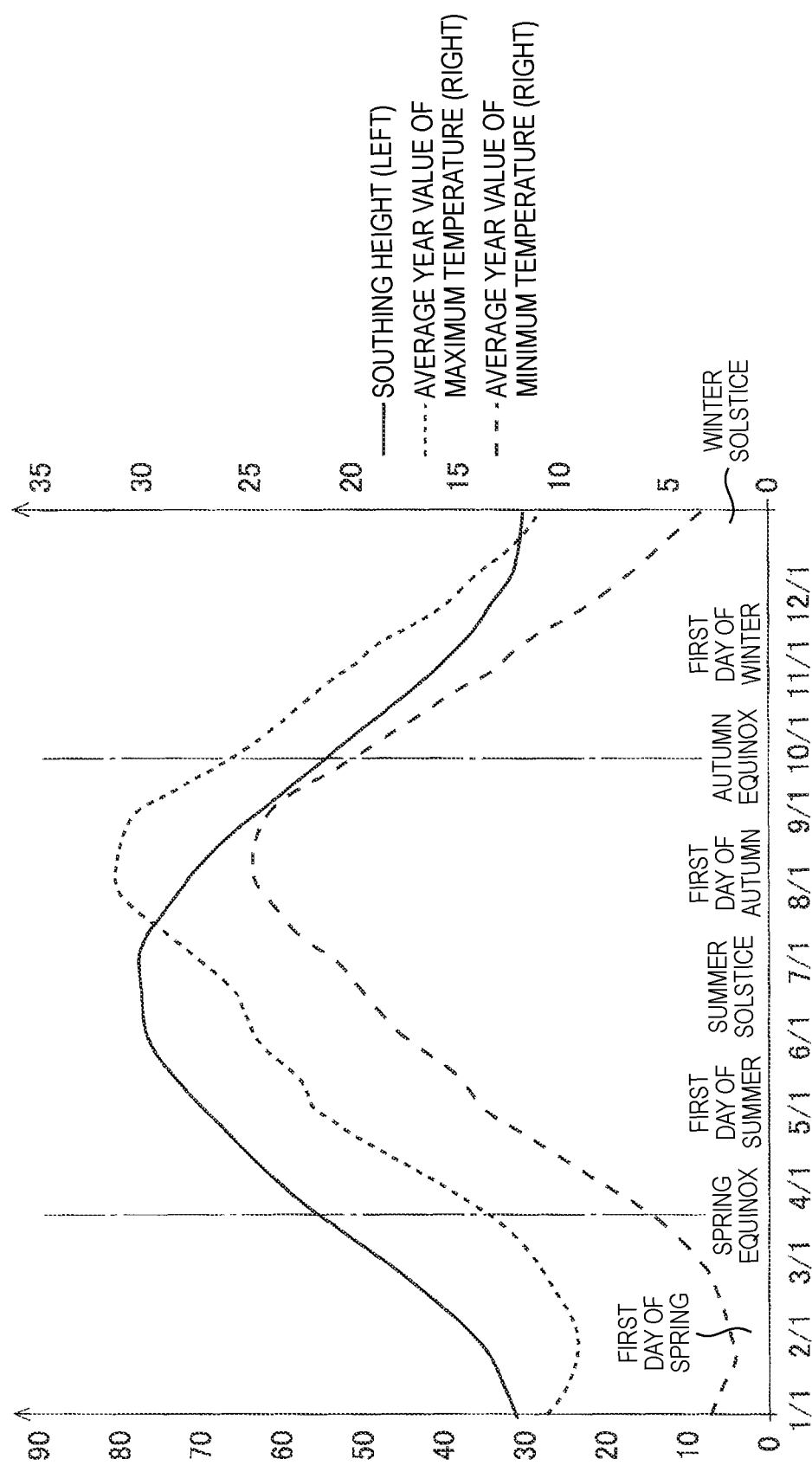
FIG. 12 is a graph showing a correlation between southing height, minimum temperature and maximum temperature of Japan.

FIG. 11A and FIG. 11B are enlarged views showing a liquid control mechanism 73 of a multi-stage prism window 5 according to the fifth embodiment. FIG. 11A shows a first state, and FIG. 11B shows a second state. As shown in FIGS. 11A and 11B, the liquid control mechanism 73 includes: a case member 73a; a bias spring (face member) 73b; a first bag 73c; a second bag 73d; and an inner tube (inner bag) 73e.

As in the case of the fourth embodiment, the case member 73a is a rigid member whose outer shape is formed into a substantially rugby ball shape. The bias spring 73b, the first bag 73c, the second bag 73d and the inner tube 73e are accommodated inside the case member 73a.

The bias spring 73b is a plate spring similar to that of the third embodiment. Upper and lower ends of the bias spring 73b are restrained by the case member 73a. The first bag 73c is adjacent to the bias spring 73b on one side of the bias spring 73b, and can accommodate liquid therein. The first bag 73c communicates with the first space S1. The second bag 73d is adjacent to the bias spring 73b on the other side of the bias spring 73b, and can accommodate liquid therein. The second bag 73d communicates with the second space S2.

The bias spring 73b is convex toward the one side where the first bag 72d is provided in a natural state. The inner tube 73e is a closed bag accommodated inside the first bag 73c. The inner tube 73e contains a substance that changes between a vaporized state and a liquefied state in accordance with temperature, and changes between an expanded state and a contracted state. The contained substance is, for example, pentane which vaporizes at 36 degrees. It is preferable that the inner tube 73e is made of materials such as ethylene tetrafluoro ethylene (ETFE), which is thermoplastic fluororesin and is a copolymer of tetrafluoroethylene and ethylene, since such materials have excellent hydrocarbon gas barrier properties.

In such a liquid control mechanism 73, as shown in FIG. 11A, the bias spring 73b protrudes to the one side when an ambient temperature is lower than a specific temperature (36 degrees) and the inner tube 73e is in the contracted state, so that the first bag 73c is flattened by the case member 73a and the bias spring 73b. Therefore, the liquid in the first bag 73c flows into the first space S1, and the first space S1 is filled with the liquid. Meanwhile, the second bag 73d is not flattened and the liquid is drained from the second space S2 to form a void in the second space S2.

In the liquid control mechanism 72, as shown in FIG. 11B, the bias spring 73b is pressed by the inner tube 73e and protrudes to the other side when the ambient temperature is equal to or higher than the specific temperature and the inner tube 73e is in the expanded state. As a result, the second bag 73d is flattened by the case member 73a and the bias spring 73b. Therefore, the liquid in the second bag 73d flows into the second space S2, and the second space S2 is filled with the liquid. Meanwhile, the first bag 73c is not flattened and the liquid is drained from the first space S1 to form a void in the first space S1.

In this way, according to the multi-stage prism window 5 according to the fifth embodiment, the state where the direct light OP1, OP2 is not directly used indoors or the state where the direct light OP1, OP2 is used indoors can be (further) optimized without depending on the seasons, which is similar to the third embodiment. In addition, the multi-stage prism window 5 whose thickness is reduced can be provided.

Further, according to the fifth embodiment, the inner tube 73e containing the substance that changes between the vaporized state and the liquefied state in accordance with the temperature is provided, and a protruding direction of the bias spring 73b is changed through using the expanded state of the inner tube 73e where the substance is in the vaporized state and the contracted state of the inner tube 73e where the substance is in the liquefied state such that one of the first bag 73c or the second bag 73d is flattened to cause the liquid to flow into the first or second space S1, S2. Therefore, control can be performed based on the temperature through using vaporization and liquefaction characteristics of the substance, and the state where the direct light OP1, OP2 is not directly used indoors or the state where the direct light OP1, OP2 is used indoors can be further optimized without depending on the seasons.

Although the present invention has been described above based on the embodiments, the present invention is not limited to the above embodiments, and various modifications may be made without departing from the spirit of the present invention or techniques of the embodiments may be appropriately combined within a possible range. Further, known or well-known techniques may also be combined within a possible range.

For example, although the first space S1 and the second space S2 are space defined by the two thin films TF in the above-described embodiments, the thin films TF may not be provided and the space may be defined by the prisms 31, 33, 41, 44, 60. The prisms 31, 33, 41, 44, 60 and the like may also be made of a transparent material which is not a soft resin.

Although examples in which the multi-stage prism windows 1 to 5 are used in standing surfaces have been described in the above embodiments, the present invention is not limited thereto, and the multi-stage prism window according to the present invention may also be provided in a roof surface.

Further, although the second prism 41 of the multi-stage prism windows 1 to 5 according to the first to fifth embodiments includes the reflective prism 41A and the endothermic prism 41B, the present invention is not limited thereto, and the second prism 41 may include only one of the reflective prism 41A or the endothermic prism 41B.

Although it is basically assumed that only one of the first space S1 or the second space S2 is filled with the liquid while the other one is a void in the multi-stage prism windows 1 to according to the first to fifth embodiments, the present invention is not limited thereto, and the multi-stage prism window according to the present invention may also be used as a normal window in which the first space S1 and the second space S2 are both filled with the liquid. Moreover, the spaces S1, S2 may both be voids.

Although the first prism element 30 and the second prism element 40 include the image restoration prisms 33, 44, the present invention is not limited thereto, and the image restoration prisms 33, 44 may not be provided. In particular, positions where the image restoration prisms 33, 44 are provided in the above embodiments may serve as the first or second space S1, S2, and the liquid may be filled therein.

The intermediate plate member 50, the intermediate prism 60 or the like may be appropriately subjected to low radiation treatment so as to make it difficult for heat of the endothermic member 43 to escape to outside of the room.

Further, although the reflective member 32 is provided on the second side 31b of the first prism 31 of the multi-stage prism windows 1 to 5 according to the first to fifth embodiments, the present invention is not limited thereto, for example, a solar cell panel (photoelectric conversion member) that uses light energy to generate power may be provided as long as the light path of the direct light OP1 to the interior of the room is blocked. In this case, the electric power obtained from the solar cell panel may be sent to outside of the multi-stage prism windows 1 to 5 and used for an operation of a cooling device or the like. The reflective member 32 is not limited to be replaced by the solar cell panel, and a heat collecting tube (heat collecting member) that uses solar heat to heat a heat medium may be provided to replace the reflective member 32. In this case, the heat medium heated by the heat collecting tube may be used for an operation of an absorption chiller, or may be used as hot water when the heat medium is water.

In addition, although each of the shape memory plate spring 72b and the bias spring 72c constitutes a part of the face member in the fourth embodiment, the present invention is not limited thereto, and a configuration in which the shape memory spring and the bias spring 72c simply oppose each other with a plate member (face member) interposed therebetween and have coil shapes may be employed. That is, the springs 72b, 72c may be members separate from the face member. Further, a configuration in which only one of the springs 72b, 72c constitutes the face member while the other one is formed as a separate member may also be employed. Moreover, the face member is not limited to protrude to the one side or the other side, and may also be configured to be entirely moved to the one side and the other side.

Further, although the bias spring 73b constitutes the face member in the fifth embodiment, the present invention is not limited thereto, and a configuration in which the bias spring 73b is simply provided on an opposite side of the inner tube 73e to sandwich a plate member (face member) as a coil-shaped member separate from the face member may be employed. In addition, in the fifth embodiment, the face member may also be configured to be entirely moved.

Although the invention has been described in detail with reference to specific embodiments, it will be apparent to those skilled in the art that various changes and modifications can be made without departing from the spirit and scope of the invention.

According to the multi-stage prism window according to the present invention, since the liquid control mechanism which is configured to fill at least one of the first space and the second space with the liquid is provided, a total reflection condition of the first prism or the second prism can be changed when the first space or the second space is filled with the liquid such that a function of the first prism or a function of the second prism is not exhibited. Therefore, if any one of the spaces is filled with the liquid in accordance with temperature, for example, without depending on the solar altitude, the functions of the first prism and the second prism can be selectively exhibited. Therefore, the state where the direct light is not directly used indoors or the state where the direct light is used indoors can be optimized without depending on the seasons.

The invention claimed is:

1. A multi-stage prism window comprising:
a first transparent plate member;
a second transparent plate member which is arranged substantially parallel to the first transparent plate member on an indoor side of the first transparent plate member;
a first prism which is arranged between the first and second transparent plate members;
an opaque member which is provided on a predetermined surface of the first prism and does not allow transmission of sunlight;
a second prism which is arranged on the indoor side of the first prism between the first and second transparent plate members;
an endothermic member which is provided on a predetermined surface of the second prism; and
a liquid control mechanism configured to fill at least one of a first space and a second space with a liquid, the first space being in contact with the first prism from the indoor side, the second space being in contact with the second prism from the indoor side, wherein
in a case where the first space is a void with no liquid filled therein, the first prism condenses light whose angle with respect to a normal line of the first and second transparent plate members is equal to or larger than a first predetermined angle on the opaque member so as to block an optical path thereof to interior of a room, and allows transmission of light whose angle is less than the first predetermined angle, and
in a case where the second space is a void with no liquid filled therein, the second prism condenses light whose angle with respect to the normal line is equal to or larger than a second predetermined angle on the endothermic member so as to use the light for indoor heating, and allows transmission of light whose angle is less than the second predetermined angle.

2. The multi-stage prism window according to claim 1 further comprising:
an intermediate prism which has a shape along the first prism on an outdoor side and forms all or part of the second prism.

3. The multi-stage prism window according to claim 1 further comprising:
an intermediate prism which has a shape along the first prism on an outdoor side and forms all or part of the second prism, wherein
the predetermined surface of the first prism where the opaque member is provided and the predetermined surface of the second prism where the endothermic member is provided are in a parallel and mounted state.

4. The multi-stage prism window according to claim 1, wherein the liquid control mechanism includes a polymer which is provided for each of the first space and the second space, the polymer changes in accordance with temperature between a state where water absorption is exhibited and a state where the water absorption is not exhibited, the polymer absorbs water and drains liquid water from the first space or the second space in the state where the water absorption is exhibited, and releases the water to fill the first space or the second space with the liquid water in the state where the water absorption is not exhibited.

5. The multi-stage prism window according to claim 1, wherein the liquid control mechanism includes: a flow channel which connects the first space and the second space; and
a pump unit configured to transfer the liquid from the first space to the second space and from the second space to the first space via the flow channel.

6. The multi-stage prism window according to claim 5, wherein the pump unit uses an operation force from a user to transfer the liquid.

7. The multi-stage prism window according to claim 1, wherein the liquid control mechanism includes: a face member; first and second bags which are respectively provided on two sides of the face member, one of which is in communication with the first space while the other one of which is in communication with the second space, the first and second bags being configured to accommodate the liquid therein; a shape memory spring which is provided as at least a part of the face member or as a separate member, the shape memory spring being configured to apply a force to cause the face member to be in an other side displacement state where the face member protrudes or moves to an other side at a temperature equal to or higher than a specific temperature; and a bias spring which is provided as at least a part of the face member or as a separate member, the bias spring being configured to cause the face member to be in the other side displacement state by not overpowering the force applied by the shape memory spring at a temperature that is equal to or higher than the specific temperature, and to cause the face member to be in an one side displacement state where the face member protrudes or moves to an one side by overpowering the force applied by the shape memory spring at a temperature that is less than the specific temperature, the first bag is flattened so as to cause the liquid to flow into the first space when the bias spring overpowers the shape memory spring and the face member is in the one side displacement state, the first bag is not flattened so as to drain the liquid from the first space and accommodate the liquid therein when the bias spring does not overpower the shape memory spring and the face member is in the other side displacement state, and the second bag is not flattened so as to drain the liquid from the second space and accommodate the liquid therein when the bias spring overpowers the shape memory spring and the face member is in the one side displacement state, the second bag is flattened so as to cause the liquid to flow into the second space when the bias spring does not overpower the shape memory spring and the face member is in the other side displacement state.

8. The multi-stage prism window according to claim 1, wherein the liquid control mechanism includes: a face member; first and second bags which are respectively provided on two sides of the face member, one of which is in communication with the first space while the other one of which is in communication with the second space, the first and second bags being configured to accommodate the liquid therein; an inner bag which is accommodated inside the first bag and contains a substance that changes between a vaporized state and a liquefied state in accordance with temperature so as to be in an expanded state at a temperature equal to or higher than a specific temperature and in a contracted state at a temperature lower than the specific temperature, the inner bag being configured to press the face member in the expanded state to cause the face member to be in an other side displacement state where the face member protrudes or moves to an other side; and a bias spring which is provided as at least a part of the face member or as a separate member, the bias spring being configured to cause the face member to be in the other side displacement state by not overpowering a force with which the inner bag presses the face member in the expanded state at a temperature that is equal to or higher than the specific temperature, and to cause the face member to be in an one side displacement state where the face member protrudes or moves to an one side at a temperature that is less than the specific temperature, the first bag is not flattened so as to drain the liquid from the first space and accommodate the liquid therein when the inner bag is in the expanded state at a temperature equal to or higher than the specific temperature and applies a pressing force to the face member such that the face member is in the other side displacement state, the first bag is flattened so as to cause the liquid to flow into the first space when the inner bag is in the contracted state at a temperature less than the specific temperature and the pressing force is not applied to the face member such that the face member is in the one side displacement state, and the second bag is flattened so as to cause the liquid to flow into the second space when the inner bag is in the expanded state at the temperature equal to or higher than the specific temperature and applies the pressing force to the face member such that the face member is in the other side displacement state, the second bag is not flattened so as to drain the liquid from the second space and accommodate the liquid therein when the inner bag is in the contracted state at the temperature less than the specific temperature and the pressing force is not applied to the face member such that the face member is in the one side displacement state.

9. A multi-stage prism window comprising:
a first transparent plate member;
a second transparent plate member which is arranged substantially parallel to the first transparent plate member on an indoor side of the first transparent plate member;
a first prism which is arranged between the first and second transparent plate members;
an opaque member which is provided on a predetermined surface of the first prism and does not allow transmission of light;
a second prism which is arranged on the indoor side of the first prism between the first and second transparent plate members;
a reflective member which is provided on a predetermined surface of the second prism; and
a liquid control mechanism configured to fill at least one of a first space and a second space with a liquid, the first space being in contact with the first prism from the indoor side, the second space being in contact with the second prism from the indoor side, wherein
in a case where the first space is a void with no liquid filled therein, the first prism condenses light whose angle with respect to a normal line of the first and second transparent plate members is equal to or larger than a first predetermined angle on the opaque member so as to block an optical path thereof to interior of a room, and allows transmission of light whose angle is less than the first predetermined angle, and
in a case where the second space is a void with no liquid filled therein, the second prism condenses light whose angle with respect to the normal line is equal to or larger than a second predetermined angle on the reflective member so as to reflect the light to an indoor ceiling side, and allows transmission of light whose angle is less than the second predetermined angle.

* * * * *